May 18, 1926.

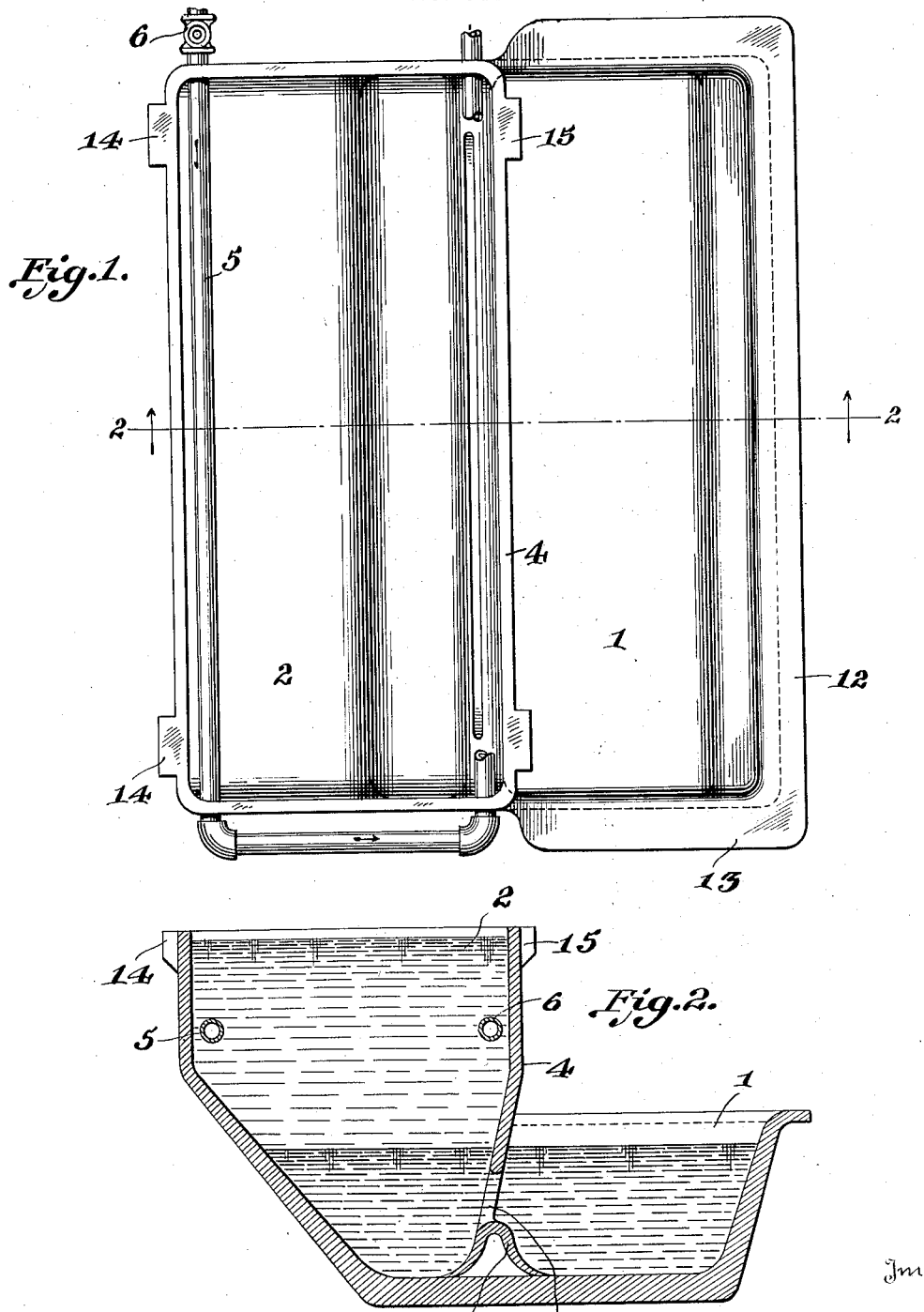

J. J. MARKEY 1,585,308

TINNING POT

Filed Feb. 19, 1925

Inventor
John J. Markey

By Mason Fenwick & Lawrence,
Attorneys

Patented May 18, 1926.

1,585,308

UNITED STATES PATENT OFFICE.

JOHN J. MARKEY, OF WASHINGTON, PENNSYLVANIA.

TINNING POT.

Application filed February 19, 1925. Serial No. 10,436.

REISSUED

This invention relates to an improved tinning pot made from wrought iron plates or other suitable material and has for its object to provide a tinning pot which will be more durable than pots heretofore constructed. The improved pot is made by bending a plate bendable under heat into approximate U-shape and welding end walls thereto. A pot made in this manner is extremely durable and not subject to breakage due to contraction and expansion under heat. The pot is also provided with a central plate extending between the side walls and having its lower edge spaced from the bottom of the pot.

In tinning pots, it is customary to provide a layer or bath of oil, such as palm oil, over the molten tin, the plates or material to be tinned passing upwardly from the molten tin through the heated oil. This oil must be kept at a certain definite temperature in order to obtain the most desirable results in the tinning operation.

Heretofore it has been necessary to ladle out the oil and replenish the supply with cool oil, an operation which is not only laborous but also time-consuming and expensive. The present invention aims to overcome this objectionable method of cooling the oil by providing a cooling coil within that part of the chamber which contains the palm oil.

The above and other features of novelty and invention will appear from the detailed description taken in connection with the accompanying drawings forming part of this specification.

Referring to the drawings:

Fig. 1 is a plan view of the improved pot showing the same as consisting of two chambers in open communication at the bottom and the cooling coil as arranged within one of these chambers.

Fig. 2 is a vertical section taken on line 2—2 of Fig. 1.

Figure 3:
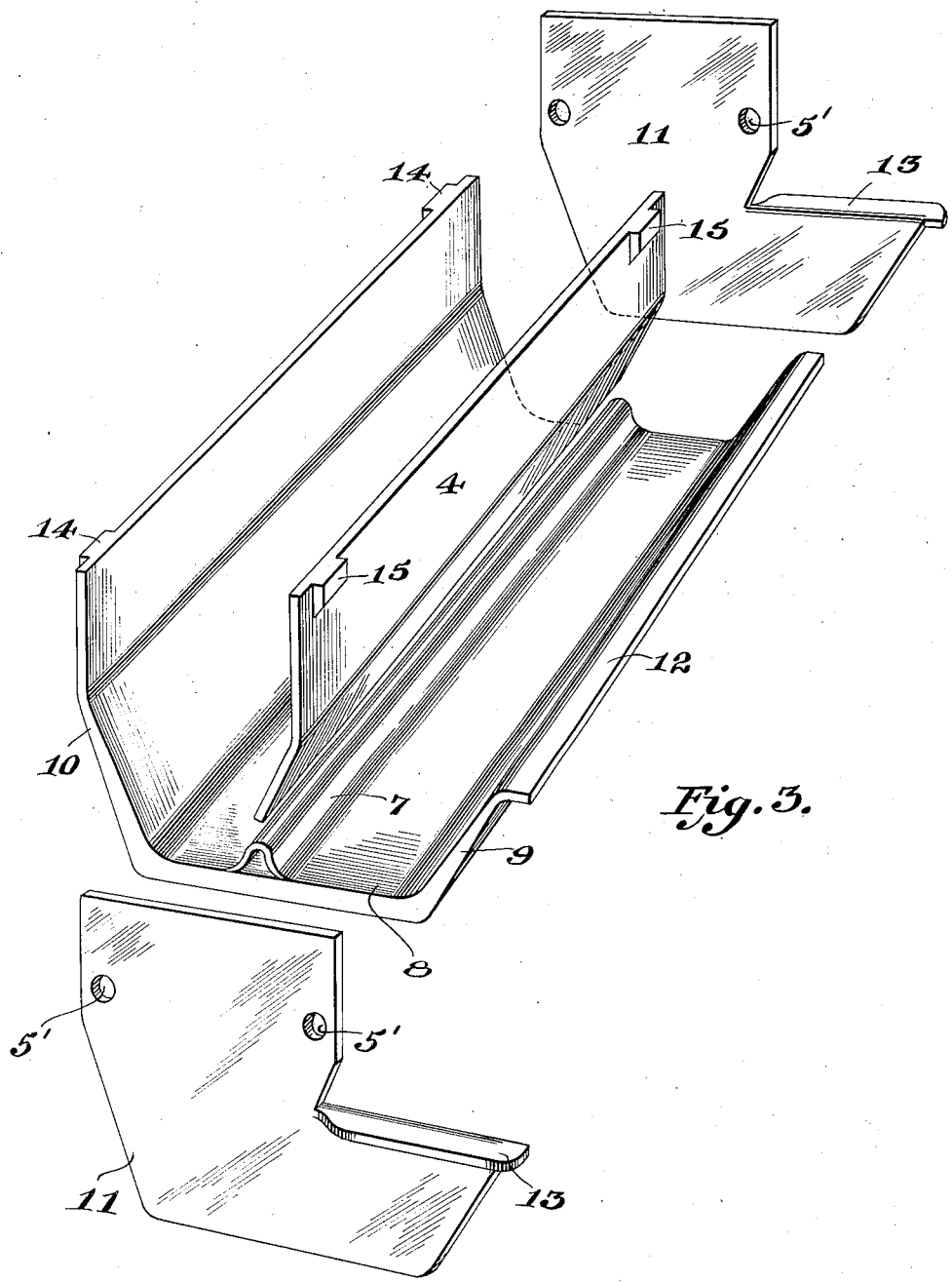
Fig. 3 is a perspective view of the parts making up the pot in disassembled relation, the cooling pipe, however, being omitted.

In the drawings, 1 indicates one chamber of the pot and 2 the other chamber, these chambers being in open communication through a passage 3 below a vertically disposed wall 4 extending between the sides of the pot. The walls of the chamber 1 are not as high as those of the chamber 2 for the reason that the chamber 2 is designed to hold oil above the molten tin in the pot. Extending along the side walls of the chamber 2 is a pipe 5 having a suitable control valve 6 for regulating the flow of cooling fluid through the pipe. This pipe is disposed a suitable distance below the top of the chamber 2 so as to obtain more than mere surface cooling of the oil. It will be obvious that by providing cooling means of the type indicated the temperature of the oil will be suitably controlled in a very easy manner by a workman standing alongside the pot manipulating the valve 6 or the temperature of the oil may be controlled by any other suitable means. Extending across the bottom of the pot is a raised portion or member 7, said member being welded to the bottom of the tank. If desired, this raised portion may be made solid.

Referring now to Fig. 3, it will be seen that the improved pot is constructed from a plurality of sheets. The bottom and side walls of the pot are formed from a plate bent into substantially U-form, the bottom of the pot being the bottom of the U, as indicated at 8, the side walls being indicated at 9 and 10. The legs of the U are of unequal length, the leg 9 being shorter than the leg 10. The ends of the pot are plates 11 which are welded to the edges of the U-plate. Inasmuch as the leg 10 is higher than the leg 9, the side plates 11 are made accordingly. The vertically arranged plate or wall intermediate the side walls is indicated at 4 and is welded to the end walls to form an integral part therewith. It will now be seen that the plate 11 is of different heights to correspond with the heights of the chambers 1 and 2. The openings through which the pipe 5 passes is indicated at 5'.

The U-shaped plate is shown as having its leg tapering from the bottom upwardly. However, the invention is not limited to a plate of this particular form inasmuch as the plate may be of uniform thickness throughout. It will also be noted that the short leg 9 has an outwardly directed flange 12 to form a lip. The plates 11 are provided with corresponding flanges 13 so that the chamber 1 is provided with a peripheral lip along three sides.

The lugs 14 and 15 cooperate with roller mechanism used in connection with the tinning pot.

It will, of course, be understood that the level of the molten tin in the pot is kept above the opening 3 so as to prevent the oil in the chamber 2 from flowing into the chamber 1. It will also be understood that the pot is employed in connection with mechanism well-known in the art for feeding the material to be tinned through the tin bath and oil in the pot. The tinning pot according to this invention may be made from a material comprising a substantially U-shaped plate bendable under heat.

What I claim is:

1. A tinning pot made from a substantially U-shaped plate bendable under heat, the plate constituting the bottom and side walls of the pot, and a plate connected to the end edges of the U-shaped member constituting the end members of the pot.

2. A tinning pot made from a substantially U-shaped plate bendable under heat, the plate constituting the bottom and side walls of the pot, and a plate connected to the end edges of the U-shaped member constituting the end members of the pot, and cooling pipes extending through the tinning pot.

In testimony whereof I affix my signature.

JOHN J. MARKEY.